Figure 1:
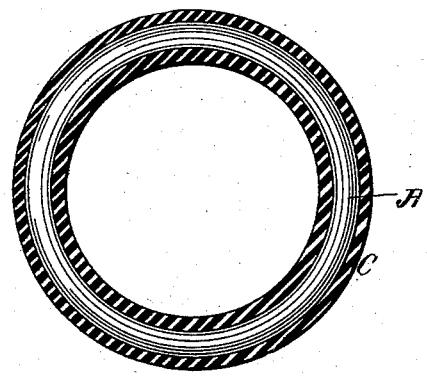
Figure 2:

D. C. LOCKWOOD.
Martingale-Ring.

No. 203,631. Patented May 14, 1878.

Witnesses:
Chas. O. Gill
W. B. Magruder.

Inventor:
David C. Lockwood
By his Attys.
Cox and Cox

UNITED STATES PATENT OFFICE.

DAVID C. LOCKWOOD, OF NEWARK, NEW JERSEY, ASSIGNOR TO THE RUBBER AND CELLULOID HARNESS TRIMMING COMPANY, OF SAME PLACE.

IMPROVEMENT IN MARTINGALE-RINGS.

Specification forming part of Letters Patent No. 203,631, dated May 14, 1878; application filed January 31, 1878.

*To all whom it may concern:*

Be it known that I, DAVID C. LOCKWOOD, of Newark, in the county of Essex and State of New Jersey, have invented a new and useful Improvement in Martingale-Rings, of which the following is a specification, reference being had to the accompanying drawing.

My invention consists in making rings for martingales, harness, and carriage-trimmings, and other purposes of a wooden, paper, or other fibrous core, coated with celluloid or other suitable plastic composition that becomes capable of homogeneous welding at a lower temperature than 212°, or thereabout, as at that or a higher degree the material becomes so heated as to calcine the wood or fiber; hence rubber is entirely unsuited for the above covering. In this manner a ring is produced stronger than if formed wholly of the material composing the coating, and lighter than if made with a wooden core.

Rings for martingales should preferably be as light, tough, and elastic as is consistent with strength.

The drawing exhibits a vertical and transverse section of the ring in question, in which A represents the core, and C the coating.

One good mode of constructing the device is to take as a core a ring of suitable size, made of some tough wood, such as seasoned dogwood, which may be turned in a lathe or otherwise constructed. In case celluloid is to be used for the coating, the core should be coated with glue, in order to prevent the core swelling under the action of the solvents, which are evolved in a vaporous form from the celluloid when under heat.

Around the core is next stuffed in molds or pressed in dies a coating of celluloid or other suitable plastic composition of the desired thickness, as shown in the drawing.

The manner of polishing and finishing the coating is similar to that ordinarily employed in the manufacture of rings having a metal core and a rubber coating.

Instead of a wooden core, the core may be made of any suitable fibrous or pulpy substance, such as papier-maché, or the material known as "vulcanized fiber," which core may be coated in the manner above described.

Rings thus constructed, although not so strong as those having iron cores, are amply tenacious enough to serve for martingales, and for most purposes to which they may be applied, and are far better for many purposes than the metal-core rings, being superior in lightness, toughness, and elasticity.

It is obvious that buckles and other articles of harness and carriage-trimmings may be made in the above-indicated manner.

I claim—

As an improved manufacture, a harness ring or trimming consisting of a wooden core coated with celluloid, substantially as specified.

In testimony that I claim the foregoing improvement in martingale-rings, as hereinbefore described, I have hereunto set my hand this 13th day of December, 1877.

DAVID C. LOCKWOOD.

Witnesses:
REUNE J. D. DUNN,
HARRY COX.